United States Patent [19]

Bush et al.

[11] 4,113,521

[45] * Sep. 12, 1978

[54] PROCESS FOR PRODUCING MAGNETIC PARTICLES BY VACUUM EVAPORATION OF IRON WITH COLLECTION ON A MAGNETIZED SURFACE

[75] Inventors: Robert F. Bush, Poughkeepsie; Joseph W. Mitchell, Montrose, both of N.Y.

[73] Assignee: International Business Machines Corporation, Armonk, N.Y.

[*] Notice: The portion of the term of this patent subsequent to Jun. 12, 1994, has been disclaimed.

[21] Appl. No.: 799,034

[22] Filed: May 20, 1977

Related U.S. Application Data

[63] Continuation of Ser. No. 460,842, Apr. 15, 1974, abandoned.

[51] Int. Cl.² .......................... B22F 9/00; C23F 7/06; H01F 1/06
[52] U.S. Cl. ................................. 148/6.35; 75/0.5 R; 75/0.5 AA; 75/0.5 BA; 106/20; 118/49; 209/223 R; 252/62.55; 252/62.56; 427/47; 427/128
[58] Field of Search .......................... 148/6, 6.3, 6.35; 252/62.56, 62.55; 423/632, 633; 75/0.5 BA, 0.5 R, 0.5 AA; 29/192 R; 118/49; 209/223 R; 427/47, 78; 106/20

[56] References Cited

U.S. PATENT DOCUMENTS

| | | | |
|---|---|---|---|
| 2,744,040 | 5/1956 | Altman | 148/6 |
| 2,996,418 | 8/1961 | Bleil | 427/47 |
| 3,063,858 | 12/1962 | Steeves | 117/107 |
| 3,132,022 | 5/1964 | Laborsky | 75/0.5 BA |
| 3,148,079 | 9/1964 | Banks et al. | 117/107 |
| 3,399,142 | 8/1968 | Conley | 252/62.56 |
| 3,795,542 | 3/1974 | Halaby et al. | 148/6.35 |
| 4,063,000 | 12/1977 | Aonuma et al. | 75/0.5 AA |

FOREIGN PATENT DOCUMENTS

| | | | |
|---|---|---|---|
| 48/31,166 | 4/1973 | Japan | 75/0.5 AA |
| 930,402 | 7/1963 | United Kingdom | 75/0.5 R |
| 972,146 | 10/1964 | United Kingdom | 75/0.5 R |

OTHER PUBLICATIONS

Rosensweig, R. E., "Magnetic Fluids", International Science and Technology, Jul. 1966.

Primary Examiner—John D. Smith
Attorney, Agent, or Firm—John J. Goodwin; Alvin J. Riddles

[57] ABSTRACT

By employing evaporation techniques, small particles, of the order of 100 Å, of $Fe_3O_4$ or FeO having relatively high magnetic moments can be fabricated.

7 Claims, 2 Drawing Figures

PROCESS FOR PRODUCING MAGNETIC PARTICLES BY VACUUM EVAPORATION OF IRON WITH COLLECTION ON A MAGNETIZED SURFACE

This application is a continuation of application Ser. No. 460,842 filed Apr. 15, 1974 now abandoned.

BACKGROUND OF THE INVENTION

Magnetic inks form an essential feature of jet printing. An ingredient employed to make ink is magnetite or $Fe_3O_4$ which is black in color and is magnetic. When small particles of such $Fe_3O_4$ are used as an ingredient of printing ink, printing can occur by causing the magnetic ink to be emitted as a narrow jet from a suitable source. While in flight, the magnetic ink is deflected by permanent magnets or electromagnets onto a recording surface moving relative to the jet stream. Many articles concerning ink jet printing have been published and only a few will be cited herein merely to give background material of the technology.

"Viscosity of Magnetic Fluid in a Magnetic Field" — R. E. Rosenzweig et al. — Journal of Colloidal and Interface Science (29) pp. 680–686 (1969).

"Ink Jet Printing" — J. Stone — The Electronic Engineer, December 1971.

"Magnetic Fluids" — R. Rosenzweig — International Science and Technology, pp. 48–56, July 1966.

Magnetite is especially suitable for making magnetic inks because (1) it is naturally black (2) it can be made small, i.e., ~50 to 200 Å and (3) has a high magnetic moment, for example, about 100+ emu/gm. One very popular way to achieve small particles of $Fe_3O_4$ suitable for making ink was to buy magnetite commercially and use ball milling machines to crush large particles into small particles. Such mechanical milling is not only very time consuming, but obtaining particles less than 100 Å by such method is difficult.

Applicants are also aware that chemical techniques may be employed whereby $Fe_2O_3$ is precipitated from a solution and by an oxidation process $Fe_2O_3$ is converted into $Fe_3O_4$. Other chemical precipitation techniques are illustrated in two U.S. Pat. Nos. 3,228,881 and 3,228,882, both of which were filed on Jan. 4, 1963 and issued on June 11, 1966.

The method that forms the present invention relies on an evaporation technique wherein pure iron $Fe°$ which has a high magnetic moment, is formed, surrounded by the oxide $Fe_3O_4$. The evaporation method described hereinbelow produces $Fe°$ particles each of which oxidizes by about 30% of its volume, after which particle growth stops for all practical purposes. Since $Fe°$ has a high magnetic moment, a particle that is mainly pure $Fe°$ and is black lends itself to use as an ink component.

Figure 1:
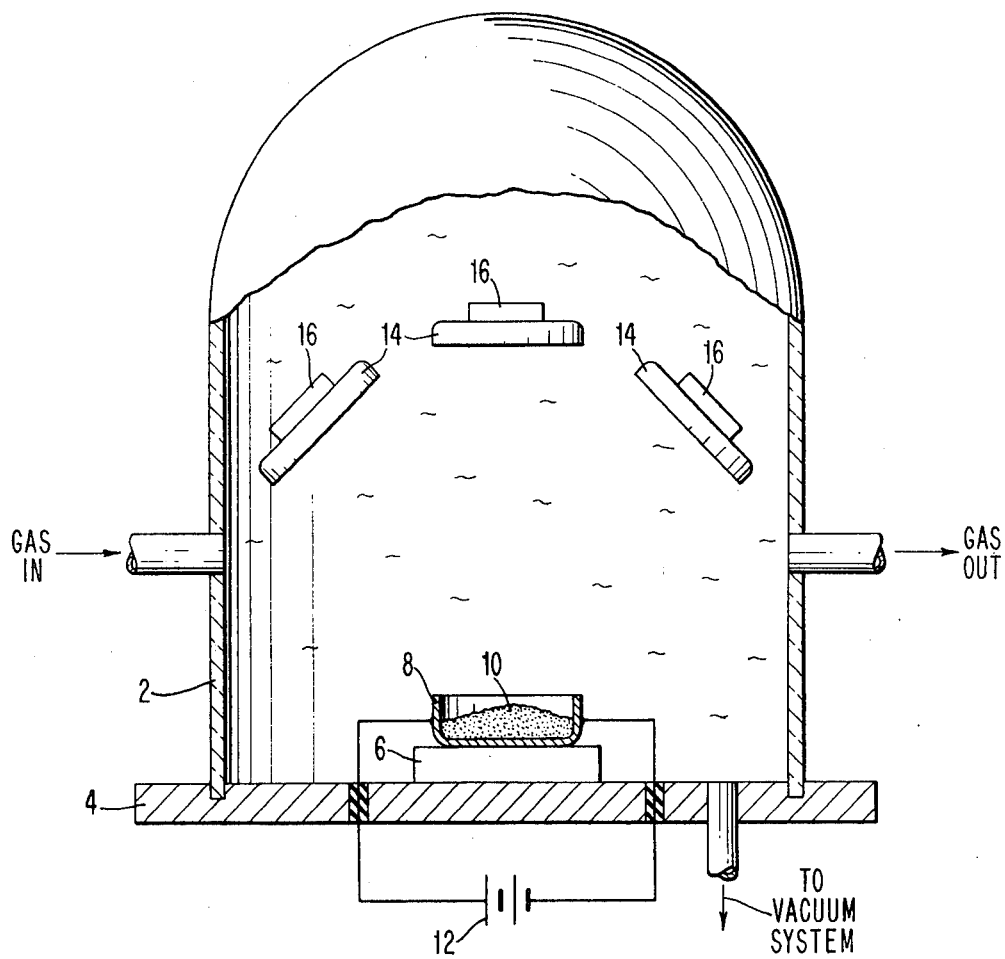
FIG. 1 is a showing of a typical evaporator employed for the manufacture of or $Fe°$.

A chamber or bell jar 2 rests on an inert support 4. Inserted into the chamber is a ceramic or other inert and highly refractory support 6 on which is placed an $AL_2O_3$ boat 8. The latter could be comprised of any other material that is inert at very high temperatures. Iron having a purity of 99.999%, is inserted as a pellet 10 or group of pellets into boat 8. A source 12 of electrical energy supplies approximately 100 amperes to the $AL_2O_3$ boat 8, heating the iron to approximately 2250° C. Prior to the actual heating of the iron, the chamber 2 is evacuated down to $10^{-6}$ mm of pressure and then backfilled to 1.0 mm of argon by conventional means, not shown.

Located within the evacuated chamber 2 are pyrex cylinders 14 behind which are placed magnets 16. The evaporated iron particles were captured by the pyrex cylinders 14. These particles oxidize immediately upon exposure to air, when removed from the evacuated chamber 2. The backfilled argon pressure can be altered from 1.0 mm to 0.1 mm during the evaporation process. In general, the greater the argon pressure, the larger are the iron particles that are evaporated.

Figure 2:
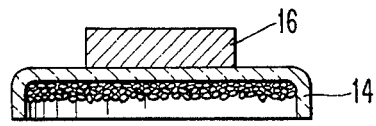
FIG. 2 is an enlarged view of one of the collecting surfaces for the minute or $Fe°$ particles produced by evaporation.

After the $Fe_3O_4$ particles were retrieved from their capturing cylinders 14, they were magnetically evaluated. The particles averaged in size from 100 Å–200 Å and had values of magnetic moments that were in a range of 82 to 111 emu/gm. The relatively high magnetism is believed due to the fact that the evaporation of iron permits very small discrete particles of pure iron to be formed and the final particle is covered with an outer shell of $Fe_3O_4$, but such outer shell is only 30% of the total volume of $Fe°$ ($Fe_3O_4$) particles. FIG. 2 is an enlarged view of the evaporated particles clinging to one another, very much like a conglomerate of caviar due to electrostatic attraction. The particles can be readily separated.

It is believed that the evaporation process, using the parameters set forth above, permits 100–200 Å sized particles to form where the larger volume (about 70%) of the particles is a core of pure $Fe_2$ surrounded by the oxide $Fe_3O_4$. Consequently the small, high magnetic moment, black particles that are produced by the method shown and described in this application are uniquely suitable for making magnetic inks employed in jet printing.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a method for producing magnetic particles for use in making magnetic inks comprising the steps of
   (a) placing substantially pure iron in a refractory support in a chamber that has been evacuated to a pressure of $10^{-6}$ mm.,
   (b) backfilling said chamber with argon,
   (c) heating said iron to its evaporation temperature and retaining it at such temperature until all or a portion of said iron has been evaporated,
   (d) collecting said evaporated particles on a magnetized surface lying in a straight line from said refractory support, and
   (e) oxidizing said collected particles at normal room temperatures and pressures.

2. The method of claim 1 wherein said argon is backfilled to a pressure of approximately one millimeter.

3. The method of claim 2 wherein said iron has a purity of 99.999%.

4. The method of claim 1 wherein said refractory support is $AL_2O_3$.

5. The method of claim 1 wherein the oxidization of said collected iron particles takes place at approximately 70° F. in ordinary atmosphere immediately upon removal from said chamber.

6. The method of claim 1 wherein the backfilled argon pressure can vary from 0.1 mm. to 1.0 mm.

7. In a method for producing magnetic particles for use in making magnetic inks comprising the steps of:

(a) placing substantially pure iron in a refractory support in a chamber that has been evacuated to a pressure of $10^{-6}$ mm.,
(b) backfilling said chamber with argon,
(c) heating said iron to its evaporation temperature and retaining it at such temperature until all or a portion of said iron has been evaporated, and
(d) collecting said evaporated particles on a magnetized surface lying in a straight line from said refractory support.

* * * * *